(12) United States Patent
Fischer

(10) Patent No.: US 6,238,726 B1
(45) Date of Patent: May 29, 2001

(54) JERKY-TYPE PET TREAT MANUFACTURING PROCESS AND PRODUCT

(76) Inventor: Kurt F. Fischer, 2780 Irene Cir., Roseville, MN (US) 55113

( * ) Notice: Subject to any disclaimer, the term of this patent is extended or adjusted under 35 U.S.C. 154(b) by 0 days.

(21) Appl. No.: 09/517,108

(22) Filed: Mar. 7, 2000

(51) Int. Cl.⁷ ..................................... A23L 1/315
(52) U.S. Cl. ................ 426/644; 426/654; 426/656; 426/658; 426/805
(58) Field of Search .................... 426/644, 654, 426/658, 656, 805

(56) References Cited

U.S. PATENT DOCUMENTS

| | | | |
|---|---|---|---|
| 3,922,353 | * 11/1975 | Berrkavicz | 426/94 |
| 4,127,678 | * 11/1978 | Burkwalk, Jr. | 426/250 |
| 4,332,832 | * 6/1982 | Buckley et al. | 426/641 |
| 4,579,741 | * 4/1986 | Hanson et al. | 426/92 |
| 5,045,339 | * 9/1991 | Ducharna | 426/641 |
| 5,290,584 | * 3/1994 | Ray | 426/637 |
| 5,552,176 | * 9/1996 | Marino | 426/641 |
| 5,654,028 | * 8/1997 | Christensen et al. | 426/574 |
| 5,676,986 | * 10/1997 | Choudhury | 426/63 |
| 5,731,029 | * 3/1998 | Karwowski et al. | 426/646 |

* cited by examiner

*Primary Examiner*—Chhaya D. Sayala

(57) ABSTRACT

A method of manufacturing a jerky-type pet treat using 70% meat content. The turkey meat is mixed with turkey liver in a ratio of 2.5 to 1.0 by weight. The meat mix is ground and treated with an anti-oxidant. This mix is then emulsified. Potato starch, dry molasses, salt and potassium sorbate are mixed to form a dry mix. The meat mix and the dry mix are fed independently into a extruder at independent rates. The meat mix and the dry mix are mixed together inside the extruder forming a complete mix. The complete mix is cooked within the extruder by using mechanical energy and steam injection forming an extrudate. The extrudate is forced through a slit-shaped die onto a conveyor belt. The conveyor belt carries the complete mix through a dryer to dry the complete mix forming the finished product.

3 Claims, No Drawings

JERKY-TYPE PET TREAT MANUFACTURING PROCESS AND PRODUCT

FIELD OF THE INVENTION

The present invention relates to a pet treat and a method of manufacturing the pet treat.

BACKGROUND OF THE INVENTION

The pet treat industry produces dry pet treat, semi-moist pet treat, and moist pet treat. The foods in each of these categories have different shelf lives based upon the amount of moisture they contain. The foods in each of these categories have different levels of fresh meat content.

Numerous processes exist for producing food products for pets. Many of these contain a low percentage of fresh meat or have a very short shelf life.

U.S. Pat. No. 4,127,678, entitled Caseinate Replacement in Semi-Moist Pet Foods, to Burkwall, Jr. describes a semi-moist pet food having the appearance and texture of meat, which formerly required sodium caseinate to achieve the meat-like texture and appearance after processing, now includes a pregelatinized or modified amylaceous material, a non-caseinate protein source, and a substantially neutral chelating agent in a combination to replace at least part of the casein salt in the semi-moist pet food to still achieve the meat-like texture and appearance after processing. Burkwall uses additional starch to partially replace the caseinate salts. Burkwall's preferred range of meat content is 15 to 35 percent. The moisture content of Burkwall's invention is about 15 percent to about 50 percent by weight. Burkwall's invention contains fat in the amount of about 0 to 12 percent by weight of the final product. This patent describes the use of an extruder in making the semi-moist pet food.

U.S. Pat. No. 4,332,832, entitled Animal Food and Method, to Buckley et al. describes a rehydratable dry animal food being prepared by a mix of comminuted, heat-treated meaty materials, fat and pregelatinized starch carbohydrate binder, forming the mix into pieces and drying the pieces to form a permeable solid pieces which rehydrate to a paste-like material of heterogeneous texture. This mix preferably contains bone fragments which lend a desirable flaky texture to the rehydrated product. The pregelatinized starch carbohydrate binder may be pregelatinized potato powder or cereal products in which the starch content is in a pregelatinized form or other starch containing products in which the starch component has been pregelatinized. Mixes contain 70 to 80 percent meaty materials, 10 percent fat and 10 to 20 percent binder. The pieces are extruded under low pressure or extrusion-expanded to give an open texture. The moisture content of the final dried product is below 15%.

U.S. Pat. No. 5,552,176, entitled Pet Food Premix Preparation, to Marino describes a pet food premix product which contains about 40 to 70 percent meat and the balance of at least one farinaceous and/or plant proteinaceous carrier substrate. Marino provides a process by which meat can be dehydrated and starch can be gelatinized, then incorporated into an extruded dry or moist food at levels from 5 percent to 50 percent of a total formulation ration. The premix, when incorporated into an extruded pet food product, will increase its operational performance while delivering nutrients and palatability to the pet food product. The final premix product contains less than about 10 percent moisture. The final premix product contains about 8 to 30 percent fat by weight.

U.S. Pat. No. 3,992,353, entitled Shelf Stable, High Moisture, Filled Food Product, to Bernotavicz, describes a shelf stable, high moisture, filled food product which has meat containing filling with a major portion thereof enclosed by cooked expanded cereal. The meat containing filling has a moisture content of at least about 50 percent by weight and a water activity, $A_w$, of at least about 0.09 and comprises cooked proteinaceous meaty materials acidified with an edible, non-toxic acid and a certain amount of antimycotic. The product is prepared by cooking a proteinaceous meaty material, mixing it with an edible, non-toxic acid and a certain amount of antimycotic, then extruding under puffing conditions a hot cooked cereal dough through a first die and simultaneously extruding the stable filling through a second die, in the same direction and without cooling, and subdividing the extrudate into food shaped pieces followed by drying the food shaped pieces to decrease the moisture content thereof. The filling containing meat has a moisture content of about 50 percent. The product includes about 2 to 4 percent fat. The meat portions and the cereal portions are cooked in a pressure cooker. They are not cooked in the extruder.

U.S. Pat. No. 5,654,028, entitled Low Calorie Meat Products, to Christensen et al. describes a low calorie meat product comprising a mixture comprising comminuted lean meat and a vegetable fat replacement ingredient comprising dietary fiber and starch. The focus of this patent is producing a low fat meat product which may contain 20 to 95 percent meat by weight. The fat contain is at most 15 percent by weight. This low fat meat product may be used as a pet food.

U.S. Pat. No. 4,579,741, entitled Fabricated Seafood, to Hanson et al. describes fabricated seafood, such as analogue shrimp meats, and their methods of preparation. A fish paste is provided which comprises about 60 to 95 percent surimi, 0 to 5 percent starch, 0 to 25 percent water and 0 to 4 percent vegetable or marine oil. The paste is blended without aeration and kept at less than 10° C. The paste is extruded as a rope to a first heating zone to heat set the exterior to form a skin. The rope is then fed to an in-line static mixture to texturize the still soft rope core. The textured rope is then heated again to firm the texturized core. The rope is then shaped into pieces of predetermined size and shape and then coagulated by heat application thereto. The fabricated seafood so prepared are characterized by the "bite," an aligned or braided fibrous interior, and the skin of real shrimp.

U.S. Pat. No. 5,676,986, entitled Food Products Made From Protease Enzyme Containing Fish, Methods of Making Same, and Methods to Inactive Protease Enzyme In Fish, to Choudhury describes a method for proteolytic degradation of fish muscle having protease enzyme which includes distributing the enzyme uniformly throughout the fish muscle and drying the fish muscle thereafter. Choudhury describes a method of making a food product and includes reducing hydrolyzed fish muscle to a powdered form, and then mixing the fish muscle in powder form with a starchy and/or proteinaceous material to form a mixture which is subsequently subjected to high temperature extrusion processing to form a desired food product. Choudhury describes processes for tenderizing or causing substantial or complete proteolytic degradation of animal muscle by applying onto the animal muscle, protease enzyme obtained from fish having the enzyme present therein. Also disclosed is the resulting food products resulting from these processes. This patent describes using 5 to 60 percent fish meat.

U.S. Pat. No. 5,290,584, entitled Method of Preparing a Snack Food Jerky Product, to Ray describes a method of preparing and producing a nutritious, low calorie, low cholesterol, shelf-stable, expanded snack food product for humans and pets. The process involves using a proteinaceous material, such as raw comminuted meats or mechanically separated meats. The proteinaceous material may be meats which are frozen or chilled. This meat is further comminuted to relatively small particle size to provide optimum dispersion of the meat products with the farinaceous (starch) component of the mixture. This blend containing the raw, frozen or chilled meat products, is mixed with pregelatinized flour and is then subjected to elevated temperatures and shear pressure as it moves through the high-temperature, short-time, screw-type extruder. Flavorings, colorings, spices, and the like, may be blended with the ingredients or may be topically applied to the extrudate prior to packaging and after cutting to desired lengths. The moisture content of the final product is less than 20 percent by weight. The fat content of the final product is less than 8 percent by weight. The starch content prior to extrusion is approximately 80 to 90 percent by weight. The protein content after extrusion is approximately 10 to 12 percent.

SUMMARY OF THE INVENTION

One of the objectives of the present invention is to develop a highly palatable, technically feasible, turkey meat dog treat product and to develop a scalable, efficient, manufacturing technique.

The present invention uses fresh, whole, clean turkeys and turkey parts which are mixed with turkey livers in a ratio of 2.5:1.0. The ratio of turkey meat and parts to turkey livers may be 5.0:0.5. More desirably the ratio of turkey meat and parts to turkey livers will be 4.0:0.75. Most desirably the ratio of turkey meat and parts to turkey livers is 2.5:1.0. This meat mix is ground and treated with anti-oxidant and then emulsified to form an emulsified meat blend. Anti-oxidants such as BHA, BHT, ethoxyquin, mixed tocopherols (vitamin E), and the like may be used.

The present invention may use other types of meats such as chicken, lamb, and beef. Turkey meat is the preferred meat. Liver meat may be from other animals such as chickens, lambs, and beef. Turkey liver is the preferred liver.

A mixture of dry ingredients is prepared. The mixture of dry ingredients may contain a combination of one or more of the following: potato starch, dry molasses, salt, pregel wheat starch, potato flakes and potassium sorbate. The mixture of dry ingredients are stored. Typically, the mixture of dry ingredients are stored in a live-bottom dry ingredient bin.

The emulsified meat blend is mixed with a natural liquid smoke forming a meat mixture. The meat mixture is stored. Typically, the meat mixture is stored in a live-bottom conical bin.

The meat mixture and the mixture of dry ingredients are fed in independent streams, at independently metered rates, directly to a set of inlets of a twin screw cooking extruder. One type of twin screw cooking extruder which may be utilized is a Wenger TX-52.

Mixing of the meat and non-meat ingredients is accomplished within the extruder forming a complete mixture. Through the application of mechanical energy and steam injection, the complete mixture of meat and non-meat dry ingredients are cooked in the extruder forming an extrudate.

The extrudate, which is wet and cooked, is forced through a slit-shaped die onto a conveyor belt. The conveyor belt carries the wet, cooked product into a dryer. Drying parameters (time, temperature, belt speed) are adjusted to achieve the requisite physical properties in the finished product consistent with the desired shelf life.

Preferably, the drying time may range from 40 minutes to 90 minutes. More preferably range of drying time is from 60 minutes to 80 minutes. Most preferably the drying time will be 70 minutes.

Preferably, the temperature range for drying the extrudate may range from 115° C. to 135° C. More preferably temperature range is 120° C. to 125° C. Most preferably, the temperature will be 120° C.

The use of pregelatinized potato starch in pet foods/treats allows the meat content to be maximized. Pregelatinized potato starch has an extremely high binding capacity as well as other characteristics allowing for the greatest meat content.

The total feed to the extruder is nearly 70% fresh meat. The product produced from the method contained herein allows this very high meat content as well as a reasonably long shelf life. The blend ratio of turkey to liver allows for a highly palatable product.

DETAILED DESCRIPTION OF THE PRESENT INVENTION

A plurality of fresh, whole, clean turkeys and turkey parts are mixed with turkey livers in a ratio of 2.5:1.0. This meat mixture is ground and treated with an anti-oxidant. The meat mixture and anti-oxidant is then emulsified. The anti-oxidant treated emulsified meat blend is mixed with a liquid natural smoke and stored in a live-bottom conical bin.

A positive displacement pump, such as a Moyno pump, is used to convey the meat blend through a mass flow meter directly to an inlet at a rear portion of an extruder barrel. A mass flow meter enables precise proportional flow control of the meat and non-meat (i.e. dry) fractions.

A mixture of starch, dry molasses, salt, and potassium sorbate (i.e. dry ingredients) are mixed and stored in a live-bottom dry ingredient bin. A screw conveyor and volumetric feed system permits control of the feed rate. This dry ingredient mix is fed to the extruder through a second inlet near the rear portion of the extruder barrel.

Several different binders may be used. Such binders may be wheat flour, wheat gluten, soy flour, tapioca starch, milk protein hydrolysate, rice flour, and potato starch. Preferably the binder used is potato starch.

Through the interaction of the twin screws in the extruder barrel, the ingredients are mixed thoroughly. Injection of steam supplements the mechanical energy input provided by the barrel-encased twin screws, cooking both the raw meats and starch while these materials are inside the extruder barrel. The extrudate is shaped through a slit-shaped die with approximate dimensions of 30 mm×3 mm. The slit-shaped die may range from 60 mm×6 mm to 10 mm×1 mm. Preferably the slit-shaped die will be approximately 30 mm×3 mm in dimension. The extrudate exits the extruder directly onto a variable speed conveyor belt.

Wet extrudate may be dried by any of several different mechanisms. The conveying system may carry the wet product directly into a continuous belt dryer where residence time, and temperature have been set to achieve the necessary finished product properties. Alternatively, the wet extrudate may be collected on trays, the filled trays assembled onto wheeled racks, and the filled racks placed in a large, batch dryer. Sample testing indicates when the product is "done."

Optimal processing parameters are:

TABLE 1

| Parameter | Setting |
|---|---|
| Meat mix feed rate | 40 kg/hour |
| Dry ingredient mix feed rate | 20 kg/hour |
| Extruder shaft speed | 400 rpm |
| Steam flow | 8 kg/hour |
| Barrel temperatures | 90–110 C. |

The present invention will be further clarified by the following examples which are intended to be purely exemplary of the present invention.

EXAMPLE 1

A product according to the present invention was prepared as follows. A meat mixture of 49.3 pounds of emulsified turkey and turkey livers were mixed with a meat mixer with 313.3 grams of natural liquid smoke and 9.1 grams of anti-oxidant. A dry ingredient mixture of 27.48 pounds of potato starch, 0.55 pounds of potassium sorbate, 3.67 pounds of salt and 18.32 pounds of dried molasses was created. The turkey and turkey liver combined were 68.1 percent of the completed product. The potato starch was 17.0 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate between 38 and 42 kg/hr.

The dry ingredient mixture was stored in a live-bottom dry ingredient bin. A screw conveyor and volumetric feed system permitted control of the feed rate. The dry mixture was fed into the extruder through a second inlet near the rear of the extruder. The dry mixture was fed into the extruder at a rate between 28 and 32 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 0 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exits at a rate of 70 kg/hr. The moisture content of the extrudate was 46.992 percent. The moisture content of the dried product was 21.128 percent.

EXAMPLE 2

A product according to the present invention was prepared as follows. A meat mixture of 49.3 pounds of emulsified turkey and turkey livers were mixed with a meat mixer with 313.3 grams of natural liquid smoke and 9.1 grams of anti-oxidant. A dry ingredient mixture of 27.48 pounds of potato starch, 0.55 pounds of potassium sorbate, 3.67 pounds of salt and 18.32 pounds of dried molasses was created. The turkey and turkey liver combined were 68.1 percent of the completed product. The potato starch was 17.0 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate of 42 kg/hr at 6.2° C.

The dry ingredient mixture was stored in a live-bottom dry ingredient bin. A screw conveyor and volumetric feed system permits control of the feed rate. The dry mixture was fed into the extruder through a second inlet near the rear of the extruder. The dry mixture was fed into the extruder at a rate of 18.8 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 7.7 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 69 kg/hr. The moisture content of the extrudate was 63.195 percent. The moisture content of the dried product was 21.769 percent.

EXAMPLE 3

A product according to the present invention was prepared as follows. A meat mixture of 49.3 pounds of emulsified turkey and turkey livers were mixed with a meat mixer with 313.3 grams of natural liquid smoke and 9.1 grams of anti-oxidant. A dry ingredient mixture of 27.48 pounds of potato starch, 0.55 pounds of potassium sorbate, 3.67 pounds of salt and 18.32 pounds of dried molasses was created. The turkey and turkey liver combined were 68.1 percent of the completed product. The potato starch was 17.0 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate of 39 kg/hr. at 6.9 C.

The dry ingredient mixture was stored in a live-bottom dry ingredient bin. A screw conveyor and volumetric feed system permits control of the feed rate. The dry mixture was fed into the extruder through a second inlet near the rear of the extruder. The dry mixture was fed into the extruder at a rate of 20.9 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 7.8 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 72.6 kg/hr. The moisture content of the extrudate was 58.476 percent. The moisture content of the dried product was 18.941 percent.

EXAMPLE 4

A product according to the present invention was prepared as follows. A meat mixture of 49.3 pounds of emulsified turkey and turkey livers were mixed with a meat mixer with 313.3 grams of natural liquid smoke and 9.1 grams of anti-oxidant. A dry ingredient mixture of 27.48 pounds of potato starch, 0.55 pounds of potassium sorbate, 3.67 pounds of salt and 18.32 pounds of dried molasses was created. The turkey and turkey liver combined were 68.1 percent of the completed product. The potato starch was 17.0 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.023 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate of 39 kg/hr.

The dry ingredient mixture was stored in a live-bottom dry ingredient bin. A screw conveyor and volumetric feed system permits control of the feed rate. The dry mixture was fed into the extruder through a second inlet near the rear of the extruder. The dry mixture was fed into the extruder at a rate 20.9 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 5.2 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 69 kg/hr. The moisture content of the extrudate was 57.699 percent. The moisture content of the dried product was 18.363.

EXAMPLE 5

A product according to the present invention was prepared as follows. A meat mixture of 110.5 pounds of emulsified turkey and turkey livers were mixed with a meat mixer with 455 grams of natural liquid smoke and 21 grams of anti-oxidant. A dry ingredient mixture of 20.6 pounds of potato starch, 6.87 pounds of potato flakes, 0.55 pounds of potassium sorbate, 3.66 pounds of salt and 18.32 pounds of dried molasses was created. The turkey was 68.1 percent of the completed product. The potato starch was 12.7 percent of the completed product. The pre-gelatinized potato starch was 4.2 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate 40 kg/hr.

The dry ingredient mixture was stored in a live-bottom dry ingredient conical bin. A screw conveyor and volumetric feed system permits control of the feed rate. The dry mixture was fed into the extruder through a second inlet near the rear of the extruder. The dry mixture was fed into the extruder at a rate of 22.4 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 8.4 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 70 kg/hr.

EXAMPLE 6

A product according to the present invention was prepared as follows. A meat mixture of 110.5 pounds of emulsified turkey and turkey livers were mixed with a meat mixer with 455 grams of natural liquid smoke and 21 grams of anti-oxidant. A dry ingredient mixture of 20.6 pounds of potato starch, 6.87 pounds of potato flakes, 0.55 pounds of potassium sorbate, 3.66 pounds of salt and 18.32 pounds of dried molasses was created. The turkey was 68.1 percent of the completed product. The potato starch was 12.7 percent of the completed product. The potato flakes were 4.2 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom bin. A positive displacement pump was used to convey the meat mixture through a mass flow meter directly to an inlet at the rear of the extruder barrel. The meat mixture was fed into the extruder at a rate 39 kg/hr.

The dry ingredient mixture was stored in a live-bottom dry ingredient conical bin. A screw conveyor and volumetric feed system permits control of the feed rate. The dry mixture was fed into the extruder through a second inlet near the rear of the extruder. The dry mixture was fed into the extruder at a rate of 22 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 4.5 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 65 kg/hr.

EXAMPLE 7

A product according to the present invention was prepared as follows. A meat mixture of 110.5 pounds of emulsified turkey and turkey livers were mixed with a meat mixer with 455 grams of natural liquid smoke and 21 grams of antioxidant. A dry ingredient mixture of 20.6 pounds of potato starch, 6.87 pounds of potato flakes, 0.55 pounds of potassium sorbate, 3.66 pounds of salt and 18.32 pounds of dried molasses was created. The meet was 68.1 percent of the completed product. The potato starch was 12.7 percent of the completed product. The potato flakes were 4.2 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate 15 kg/hr.

The dry ingredient mixture was stored in a live-bottom dry ingredient conical bin. A screw conveyor and volumetric feed system permits control of the feed rate. The dry mixture was fed into the extruder through a second inlet near the rear of the extruder. The dry mixture was fed into the extruder at a rate of 8.4 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 1.9 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 37 kg/hr.

EXAMPLE 8

A product according to the present invention was prepared as follows. A meat mixture of 110.5 pounds of emulsified turkey and turkey livers were mixed with a meat mixer with 455 grams of natural liquid smoke and 21 grams of anti-oxidant. A dry ingredient mixture of 20.6 pounds of potato starch, 6.87 pounds of potato flakes, 0.55 pounds of potassium sorbate, 3.66 pounds of salt and 18.32 pounds of dried molasses was created. The turkey was 68.1 percent of the completed product. The potato starch was 12.7 percent of the completed product. The potato flakes were 4.2 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate 30 kg/hr.

The dry ingredient mixture was stored in a live-bottom dry ingredient conical bin. A screw conveyor and volumetric feed system permits control of the feed rate. The dry mixture was fed into the extruder through a second inlet near the rear of the extruder. The dry mixture was fed into the extruder at a rate of 16.8 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 3.5 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 50 kg/hr.

EXAMPLE 9

A product according to the present invention was prepared as follows. A meat mixture of 55 pounds of emulsified turkey and turkey livers were mixed with a meat mixer with 370 grams of natural liquid smoke and 10 grams of anti-oxidant. A dry ingredient mixture of 6.87 pounds of potato starch, 6.87 pounds of pregel wheat starch, 122.6 grams of potassium sorbate, 1.83 pounds of salt and 9.16 pounds of dried molasses was created. The turkey was 68.1 percent of the completed product. The potato starch was 8.5 percent of the completed product. The pregel wheat starch was 8.5 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate 30 kg/hr.

The dry ingredient mixture was stored in a live-bottom dry ingredient bin. A screw conveyor and volumetric feed system permits control of the feed rate. The dry mixture was fed into the extruder through a second inlet near the rear of the extruder. The dry mixture was fed into the extruder at a rate of 16.8 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 2.8 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 49 kg/hr.

EXAMPLE 10

A product according to the present invention was prepared as follows. A meat mixture of 55 pounds of emulsified turkey and turkey livers were mixed with a meat mixer with 370 grams of natural liquid smoke and 10 grams of anti-oxidant. A dry ingredient mixture of 6.87 pounds of potato starch, 6.87 pounds of pregel wheat starch, 122.6 grams of potassium sorbate, 1.83 pounds of salt and 9.16 pounds of dried molasses was created. The turkey was 68.1 percent of the completed product. The potato starch was 8.5 percent of the completed product. The pregel wheat starch was 8.5 percent of the completed product. The dried molasses was 11.3 percent of the completed product. The salt was 2.3 percent of the completed product. The natural liquid smoke was 1.0 percent of the completed product. The potassium sorbate was 0.3 percent of the completed product. The anti-oxidant was 0.028 percent of the completed product.

The meat mixture was stored in a live-bottom conical bin. A positive displacement pump was used to convey the meat mixture through a mass flow meter directly to an inlet at the rear of the extruder barrel. The meat mixture was fed into the extruder at a rate 30 kg/hr.

The dry ingredient mixture was stored in a live-bottom dry ingredient conical bin. A screw conveyor and volumetric feed system permits control of the feed rate. The dry mixture was fed into the extruder through a second inlet near the rear of the extruder. The dry mixture was fed into the extruder at a rate of 16.8 kg/hr.

The meat mixture and the dry mixture were mixed thoroughly by the interaction of the twin screws in the extruder barrel. Injection of steam supplements the mechanical energy input provided by the barrel-encased twin screws to cook the complete mixture. The rate of the steam flow was 2.8 kg/hr.

The complete mixture is shaped through a slit-shaped die with approximate dimensions of 30 mm×3 mm. The extrudate (i.e., the complete mixture) exits the extruder directly onto a variable speed conveyor belt. The extrudate exited at a rate of 49 kg/hr.

That which is claimed is:

1. A method of producing a pet treat resembling jerky, said method comprising the steps of:

(a) mixing turkey meat with turkey liver in a ratio of 5.0 to 0.5 by weight to form a meat mix;

(b) treating the meat mix with anti-oxidant;

(c) emulsifying the meat mix;

(d) mixing potato starch, dry molasses, salt and potassium sorbate to form a dry mix;

(e) placing the meat mix into a live-bottom conical bin;

(f) placing the dry mix into a live-bottom dry ingredient bin;

(g) conveying the meat mix through a mass flow meter to an inlet at a rear portion of an extruder barrel;

(h) conveying the dry mix to a second inlet at the rear portion of the extruder barrel;

(i) mixing the meat mix and the dry mix within the extruder forming a complete mix;

(j) cooking the complete mix within the extruder using steam injection and mechanical energy forming an extrudate;

(k) forcing the extrudate through a slit-shaped die onto a conveyor belt;

(l) drying the extrudate.

2. The method of producing a pet treat resembling jerky according to claim 1, wherein said method includes the step of mixing said turkey meat with said turkey liver to form a meat mix in a ratio of 2.5 to 1.0.

3. The method of claim 1 wherein the ratio of turkey meat to turkey livers is 4.0:0.75.

* * * * *